United States Patent
Gray

(10) Patent No.: US 7,516,966 B2
(45) Date of Patent: Apr. 14, 2009

(54) CONVERTIBLE DUAL STROLLER AND METHODS THEREFOR

(76) Inventor: Benjamin D. Gray, 427 Shannon Dr., SW., Atlanta, GA (US) 30310

( * ) Notice: Subject to any disclaimer, the term of this patent is extended or adjusted under 35 U.S.C. 154(b) by 0 days.

(21) Appl. No.: 11/880,537

(22) Filed: Jul. 23, 2007

(65) Prior Publication Data

US 2009/0026733 A1   Jan. 29, 2009

(51) Int. Cl.
*B62B 7/12* (2006.01)
(52) U.S. Cl. .............. 280/47.38; 280/642; 280/647; 280/643; 280/646; 280/648; 280/649; 280/650
(58) Field of Classification Search ............. 280/47.38, 280/642, 647, 643, 646, 648, 649, 650
See application file for complete search history.

(56) References Cited

U.S. PATENT DOCUMENTS

| 3,995,882 | A |  | 12/1976 | Watkins |
| 4,083,579 | A |  | 4/1978 | Basey, Jr. et al. |
| 4,805,938 | A | * | 2/1989 | Redmond et al. ........ 280/47.35 |
| 5,333,893 | A |  | 8/1994 | Chen |
| 5,522,121 | A | * | 6/1996 | Fraynd et al. ................ 24/335 |
| 5,653,460 | A |  | 8/1997 | Fogarty |
| 5,664,795 | A |  | 9/1997 | Haung |
| 5,722,682 | A |  | 3/1998 | Wang |
| 5,769,448 | A |  | 6/1998 | Wang |
| 5,918,892 | A | * | 7/1999 | Aaron et al. ............. 280/47.38 |
| 6,267,406 | B1 |  | 7/2001 | Huang |
| 6,431,579 | B1 | * | 8/2002 | Kaneko et al. ............. 280/642 |
| 6,527,294 | B1 | * | 3/2003 | Brewington et al. ........ 280/647 |
| 6,752,405 | B1 | * | 6/2004 | Wright .................... 280/47.38 |
| 2003/0020259 | A1 |  | 1/2003 | Tai et al. |
| 2008/0179863 | A1 | * | 7/2008 | Schonfeld .................. 280/642 |

* cited by examiner

*Primary Examiner*—Christopher P Ellis
*Assistant Examiner*—Cynthia F Collado
(74) *Attorney, Agent, or Firm*—Williamson Intellectual Property Law, LLC; Thomas R. Williamson, III

(57) ABSTRACT

A convertible dual stroller and methods therefor is provided for seating at least two children side-by-side when fully expanded, a single child when partially expanded and partially collapsed, and which is fully collapsible for storage. A secondary stroller portion is fixedly secured with a primary stroller portion and the secondary stroller portion may be collapsed when the convertible dual stroller is partially expanded and partially collapsed to seat one child while the primary stroller portion supports and transports the secondary stroller portion while the secondary stroller portion is collapsed.

21 Claims, 4 Drawing Sheets

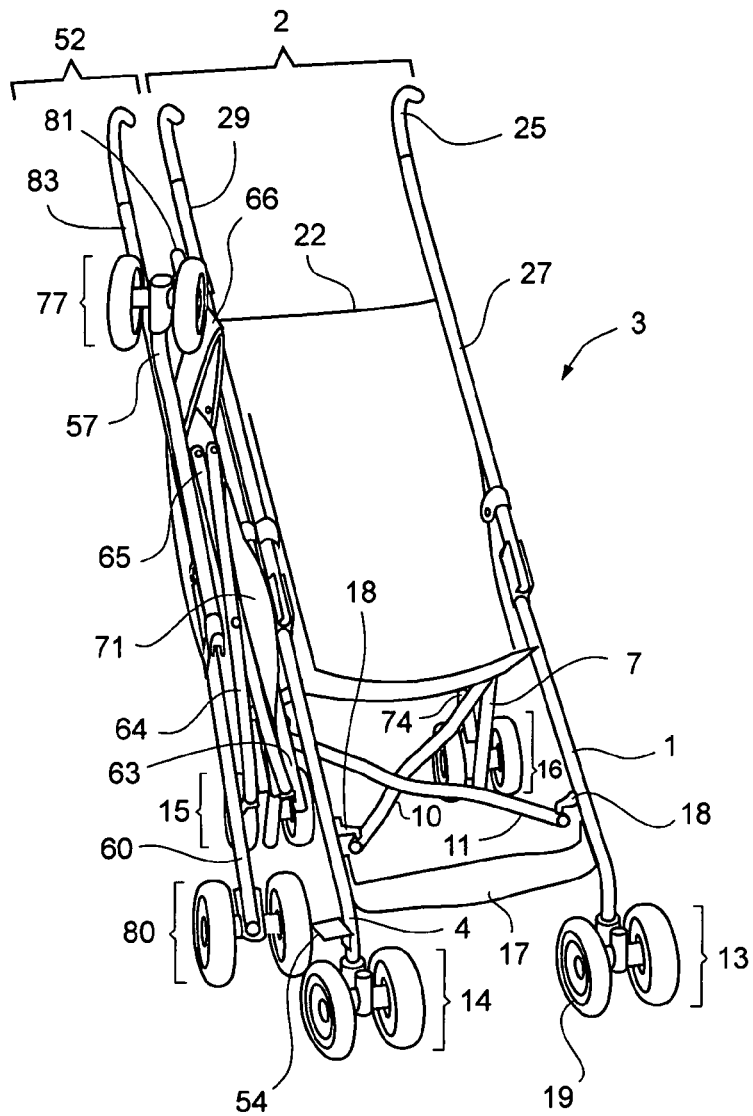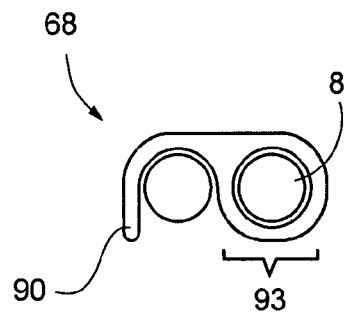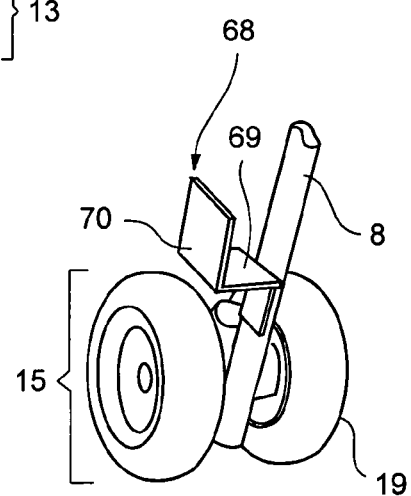

CONVERTIBLE DUAL STROLLER AND METHODS THEREFOR

FIELD OF INVENTION

The present invention relates to strollers for children, more particularly to a convertible dual stroller and methods therefor, wherein the convertible dual stroller has side-by-side seating, and wherein the stroller seats either one child or two children, and wherein when the convertible dual stroller is seating only one child, the secondary stroller is collapsed and disposed on the primary stroller.

BACKGROUND ART

There are various types of strollers which are capable of holding two children. One group of devices allows two children to sit one in front of the other, either facing each other or one child behind the other; however, these strollers require both seats to be closed when either is not in use and lack the ability to leave one of the seats open if it is desired to only have one child in the stroller. Further, their design typically makes them particularly heavy for a single person to lift and adds to the complexity of collapsing the stroller.

Another group of devices comprises collapsible type strollers with a soft seat, commonly referred to as "umbrella strollers." While these types of strollers are generally lightweight, easily collapsible and transportable most lack the capability to comfortably carry multiple children. Umbrella strollers which are capable of seating multiple children require shared legs and frame members and must be opened or closed as a single unit.

Yet another group of devices discloses connectors utilized to join at least two strollers together. Although this allows for two separable strollers, removal of the connectors is often cumbersome and these types of devices often have problems with unwanted separating, particularly when the combined strollers are pulled in the reverse direction, thereby making them unwieldy. Further, they lack the ability to allow one stroller to collapse, while the expanded stroller supports the collapsed stroller to allow for easier movement and maneuvering, particularly in crowded areas or narrow spaces. Additionally, connectors significantly add to the width of the combined strollers and navigating both strollers while only one is in use is tiresome and over-encumbering.

Still another group of dual strollers allows two separable strollers to be placed in a side-by-side relationship; however, many of these strollers require separation before collapsing one of the strollers and others require unnecessary and cumbersome steps such as securing connectors, folding wheels or attaching cables.

Therefore, it is readily apparent that there is a need for a convertible dual stroller and methods therefor which minimizes and/or overcomes these deficiencies by providing a lightweight side-by-side dual stroller which is capable of seating one or two children, supporting the collapsed stroller portion when not in use, and which is easily and quickly collapsed or expanded. This would serve the functions of improving maneuverability, reducing cost, time and inefficiencies, while providing maximum customer satisfaction, ease of use, and the ability to seat a single child or two children.

SUMMARY OF THE INVENTION

Briefly described, in a preferred embodiment, the present invention overcomes the above-mentioned disadvantages and meets the recognized need for such a device by providing a convertible dual stroller and methods therefor, wherein a secondary stroller portion is disposed on a primary stroller portion in a side-by-side relationship. Thus, the convertible dual stroller may seat either one child or two children, and when seating only one child the secondary stroller may be collapsed, yet still be supported by the primary stroller portion to allow for easier mobility and handling of the convertible dual stroller, particularly in crowded or narrow spaces without the need to carry or otherwise dispose of the secondary stroller. Further, when the convertible dual stroller is in the fully open position, the primary stroller portion supports a substantial portion of the weight of the secondary stroller portion and any child seated in the secondary stroller portion. Thus, wheels additional to the two outer wheels of the secondary stroller, which would require extra steps when collapsing and expanding the secondary stroller portion, are not necessary. Additionally, the secondary stroller portion is fixedly secured with a primary stroller portion, and the secondary stroller portion may be collapsed when the convertible dual stroller is partially expanded to seat one child in the primary stroller portion, while the primary stroller portion supports and transports the secondary stroller portion while the secondary stroller portion is collapsed.

According to its major aspects and broadly stated, the present invention in a preferred form is a convertible dual stroller and methods therefor comprising a primary stroller and a secondary stroller, wherein the primary stroller comprises a plurality of primary front legs, a primary left rear leg, a primary right rear leg, a primary upper left frame member and a primary upper right frame member. The secondary stroller comprises a secondary front left leg, a secondary front right leg, a secondary rear left leg, a secondary rear right leg, a secondary upper left frame member and a secondary upper right frame member, wherein a substantial portion of the weight of the secondary stroller portion is born by the primary stroller when the primary stroller portion and the secondary stroller portion is fully expanded. Thus, a convertible dual stroller is provided which selectively seats one or two children.

In another preferred embodiment, a front support is disposed on the primary front right leg, wherein the secondary front left leg rests on the front support when both the primary stroller and the secondary stroller are expanded. Thus, when necessary, additional support may be provided to the stroller.

In a preferred embodiment, the secondary rear left leg is held in place by a rear bracket. One skilled in the art would recognize that the rear bracket may comprise any type of bracket, clamp or other means which prevents lateral separation of the primary rear right leg and the secondary rear left leg while still allowing vertical movement which is necessary as the secondary stroller is collapsed. In this manner, the primary stroller and the secondary stroller are secured together, which is of particular importance if the combined convertible dual stroller is pulled in a backwards direction, as the two stroller sections could otherwise tend to separate.

In yet another preferred embodiment, the convertible dual stroller further comprises a rear bracket, wherein when the secondary stroller portion is opened to an operational position, the secondary rear left leg is in supported communication via the rear bracket. In this manner, the weight of the secondary stroller is distributed throughout the primary stroller. Additionally, the rear bracket provides a safety feature by acting as a redundant weight bearer in case of the failure of one or more of the weight bearing portions of the primary stroller or the front support.

In a further preferred embodiment, the primary upper right member and the secondary upper left member comprise a unitary piece, providing additional support to the secondary stroller portion. One skilled in the art would recognize that the primary upper right member and the secondary upper left member may also be attached via different means including, but not limited to, screws, bolts, rivets, glue, clamps, welding, zip ties, tape and/or any combination thereof.

In another preferred embodiment, the primary stroller further comprises a plurality of primary inter-connectors positioned between the primary front right leg and the primary left rear leg and between the primary front left leg and the primary right rear leg. In a preferred embodiment, the secondary stroller also further comprises a plurality of secondary inter-connectors positioned between the secondary front left leg and the secondary rear right leg and between the secondary front right leg and the secondary rear left leg. Inter-connectors provide added support and stability to the stroller and thus increase the safety of the primary and secondary strollers individually and combined.

In still another preferred embodiment the primary stroller further comprises a primary seat. In a preferred embodiment, the secondary stroller also further comprises a secondary seat. Thus, a more comfortable sitting area is provided for one or both children.

In yet another preferred embodiment, the primary stroller further comprises a plurality of primary wheels disposed on the plurality of primary front legs, on the primary left rear leg and on the primary right rear leg. In a preferred embodiment, the secondary stroller further comprises at least one secondary wheel disposed on the secondary front right leg and at least one secondary wheel on the secondary rear right leg. The wheels provide stability to the convertible dual stroller while simplifying movement.

In a preferred embodiment, a convertible stroller comprises the primary stroller and the secondary stroller. In a further embodiment, the convertible stroller comprises six wheel sets. In another preferred embodiment, each of the six wheel sets comprises at least one wheel. In a further preferred embodiment, each of the six wheel sets is fixedly secured to the convertible stroller such that at least one wheel moves. In still another preferred embodiment, the convertible stroller comprises at least one handle to aid in moving the convertible stroller.

In another preferred embodiment wherein the primary stroller and the secondary stroller are disposed side-by-side. A side-by-side relation allows for the secondary stroller to collapse, thus providing a stroller which is convertible to seat either one child or two children, and making the convertible dual stroller more navigable in crowded areas or narrow spaces.

In yet another preferred embodiment, the primary stroller and the secondary stroller are functionally inseparable. Accordingly, if the primary stroller and secondary stroller were separated, the secondary stroller would not function as a stroller due to the lack of wheels on the secondary front left leg and the secondary rear left leg of the secondary stroller.

In use, the stroller is converted from dual occupancy to single occupancy by collapsing the secondary stroller, wherein the secondary stroller is fixedly secured to the primary stroller, and wherein the primary stroller and secondary stroller are arranged in a side-by-side relation thereby providing a convertible dual-seated stroller which seats either a single child or two children.

In a preferred embodiment, a convertible dual/single stroller system comprises a primary stroller, a secondary stroller and a rear bracket, wherein said secondary rear left leg is restrained by a rear bracket when said secondary stroller portion is opened to an operational disposition. In the same embodiment, the primary stroller comprises a plurality of primary front legs, a plurality of primary rear legs, a plurality of primary inter-connectors positioned between the plurality of primary front legs and the plurality of primary rear legs, a plurality of wheels disposed on the plurality of primary front legs and on the plurality of primary rear legs, a primary upper left frame member, a primary upper right frame member and a primary seat disposed on the primary stroller, wherein the primary stroller is collapsible. In the same embodiment of the convertible dual/single stroller system, the secondary stroller comprises a secondary front left leg, a secondary front right leg, a secondary rear left leg, a secondary rear right leg, a first secondary inter-connector positioned between the secondary front left leg and the secondary rear right leg, a second secondary inter-connector positioned between the secondary front right leg and the secondary rear left leg, at least one wheel disposed on the secondary front right leg and the secondary rear right leg, a secondary upper left frame member, a secondary upper right frame member, and a secondary seat disposed on the secondary stroller, and wherein the secondary stroller is collapsible independent of the primary stroller, and wherein said primary stroller supports the weight of said secondary stroller. Thus a stroller is provided which seats either one or two children in a side-by-side fashion wherein the weight of the secondary stroller is supported by the primary stroller and while the stroller allows the secondary stroller to collapse independently of the primary stroller.

Accordingly, a feature and advantage of the present invention is its ability to provide a stroller which may seat a single child or two children comfortably.

Another feature and advantage of the present invention is its ability to provide a stroller which may seat a single child or two children in a side-by-side relationship.

Still another feature and advantage of the present invention is its ability to allow a secondary stroller to collapse while being fixedly secured to, and carried by, a primary stroller.

Yet another feature and advantage of the present invention is its ease of movement in either a forward or backward direction while preventing the separation of the primary and secondary stroller.

Yet still another feature and advantage of the present invention is its ability to quickly and easily collapse from a double stroller to a single stroller, thus allowing easier maneuvering in crowded areas or narrow spaces.

Still another feature and advantage of the present invention is its ability to quickly and easily expand from a single stroller to a double stroller, thus being capable of seating two children simultaneously.

A further feature and advantage of the present invention is its ability to quickly and easily collapse from a dual or single open stroller to a collapsed dual stroller, thereby allowing for compact storage and transportation.

These and other features and advantages of the present invention will become more apparent to one skilled in the art from the following description and claims when read in light of the accompanying drawings.

BRIEF DESCRIPTION OF THE SEVERAL VIEWS OF THE DRAWINGS

The present invention will be better understood by reading the Detailed Description of the Preferred and Selected Alternate Embodiments with reference to the accompanying drawing figures, in which like reference numerals denote similar structure and refer to the elements throughout, and in which:

FIG. 2 shows a perspective view of a convertible dual stroller in a preferred embodiment, showing secondary stroller collapsed when not in use;

FIG. 3A shows a perspective detail view of a bracket utilized to secure a rear leg of a secondary stroller in an alternate embodiment;

FIG. 3B shows a cross section detail view of a bracket utilized to secure a rear leg of a secondary stroller in a preferred embodiment;

DETAILED DESCRIPTION OF THE PREFERRED AND SELECTED ALTERNATE EMBODIMENTS

In describing the preferred and selected alternate embodiments of the present invention, as illustrated in FIGS. 1-5, specific terminology is employed for the sake of clarity. The invention, however, is not intended to be limited to the specific terminology so selected, and it is to be understood that each specific element includes all technical equivalents that operate in a similar manner to accomplish similar functions.

Figure 1:
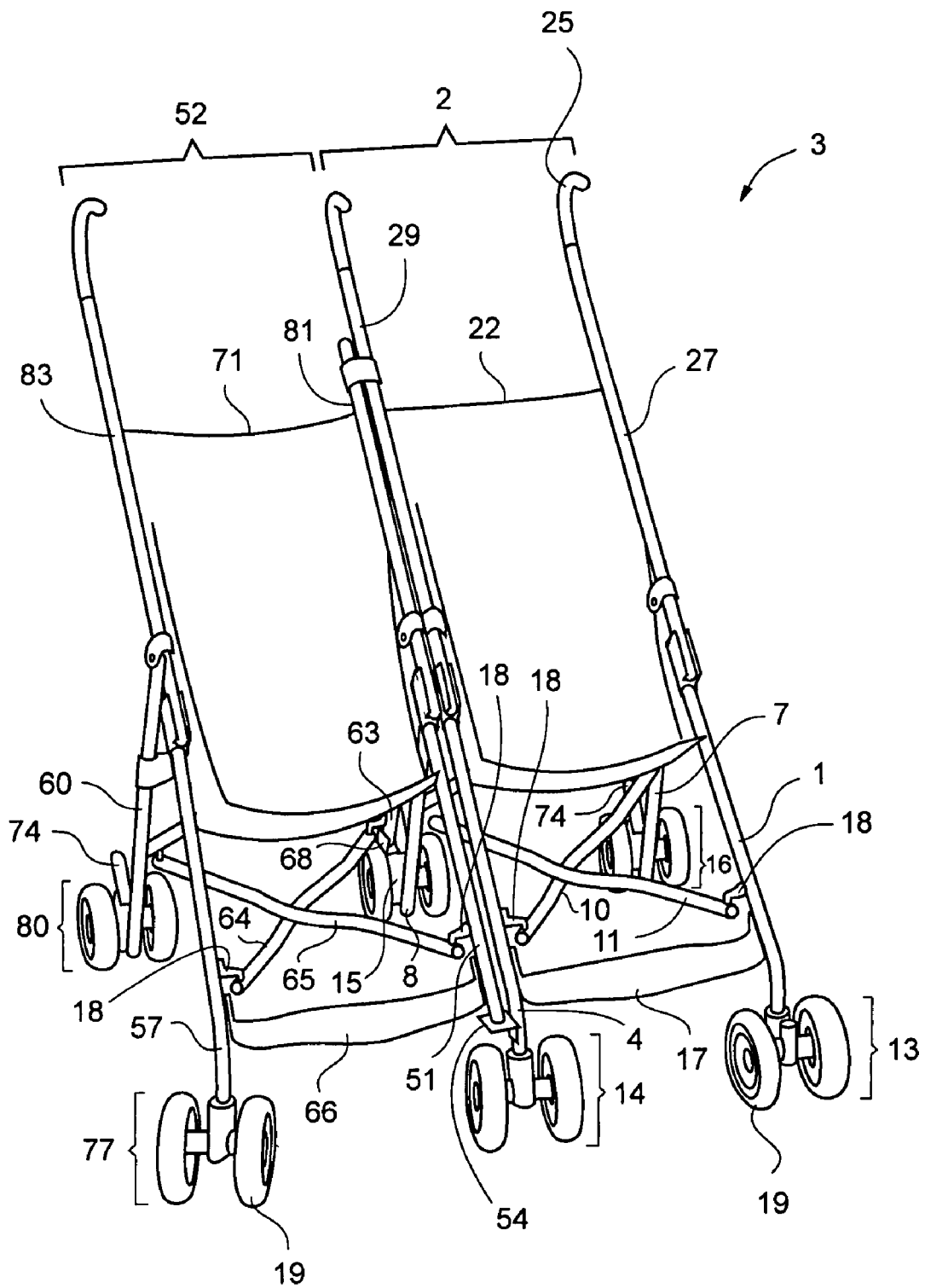
FIG. 1 shows a perspective view of a fully expanded convertible dual stroller in a preferred embodiment.
Figure 4:
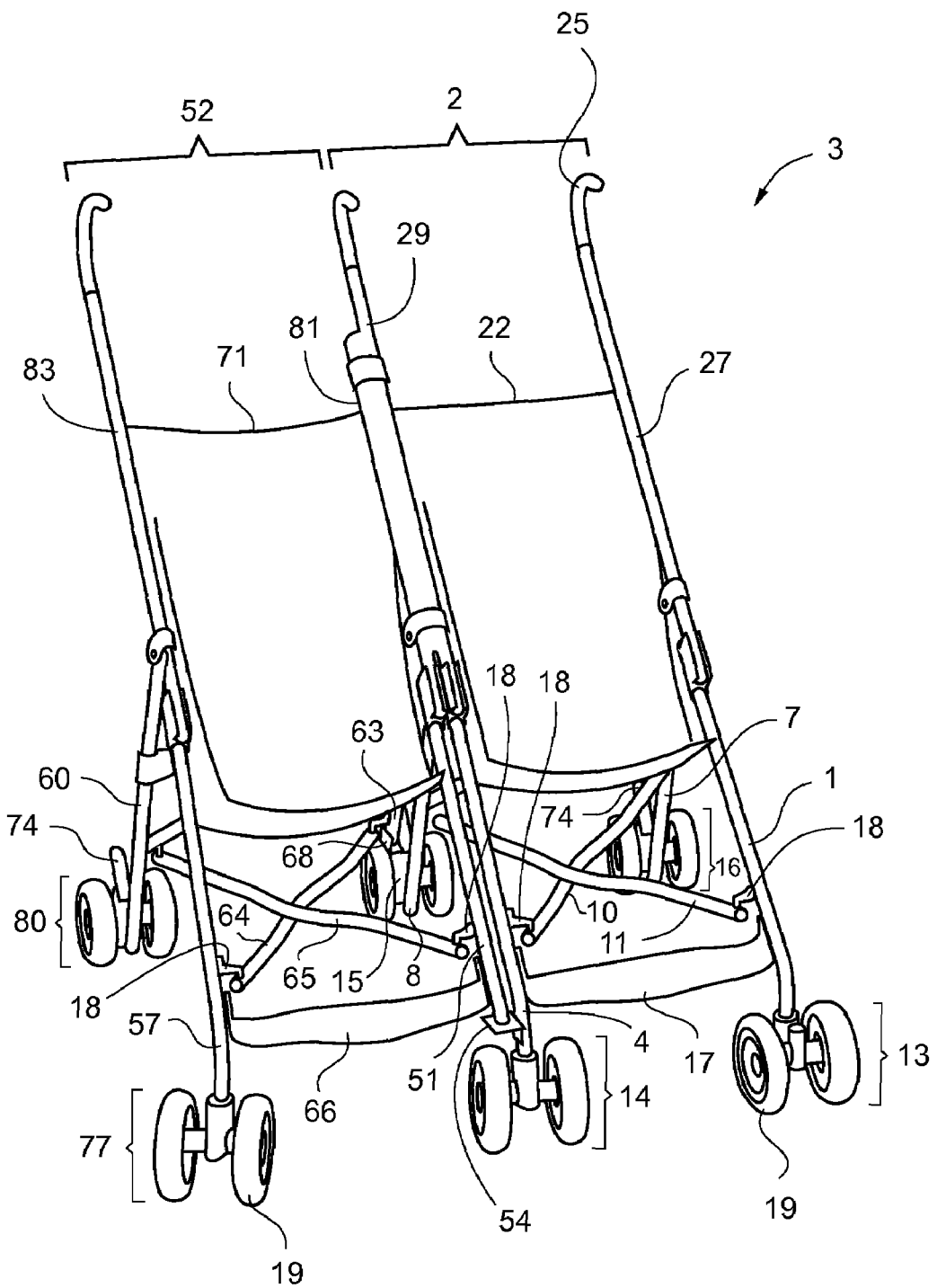
FIG. 4 depicts a convertible dual stroller in an alternate embodiment showing the stroller with a unitary handle piece.

Referring now to FIGS. 1 and 2, the present invention in a preferred embodiment preferably comprises convertible dual stroller 3, wherein convertible dual stroller 3 preferably further comprises primary stroller portion 2 and secondary stroller portion 52. Primary stroller portion 2 preferably comprises primary front left leg 1, primary front right leg 4, primary rear left leg 7 and primary rear right leg 8 to provide support to the convertible dual stroller 3 and the primary seat 22. Primary stroller portion 2 preferably further comprises first primary inter-connector 11 preferably positioned between and disposed on primary front left leg 1 and primary rear right leg 8. Second primary inter-connector 10 is preferably positioned between and disposed on primary front right leg 4 and primary rear left leg 7, wherein first primary inter-connector 11 and second primary inter-connector 10 provide support to primary stroller portion 2 while still permitting the primary stroller portion to be collapsed for compact storage. Inter-connectors 10, 11 are optionally pivotally secured via swivels 18, wherein swivels 18 are in pivotal communication with legs 1, 4, 7 and 8. Primary front left leg 1 preferably has primary front left leg wheel set 13 disposed thereon. Primary front right leg 4 preferably has primary front right leg wheel set 14 disposed thereon. Primary rear left leg 7 preferably has primary rear left leg wheel set 16 disposed thereon. Primary rear right leg 8 preferably has primary rear right leg wheel set 15 disposed thereon. Primary front left leg wheel set 13, primary front right leg wheel set 14, primary rear left leg wheel set 16 and primary rear right leg wheel set 15 preferably each have at least one wheel 19 disposed thereon. Wheel sets 13, 14, 15 and 16 are rotationally secured to their respective legs 1, 4, 7 and 8. Wheel sets 13, 14, 15, 16 and wheels 19 facilitate easy movement when the stroller is being maneuvered. Primary stroller portion 2 preferably also comprises primary upper left frame member 27 disposed on primary front left leg 1 and primary upper right frame member 29 disposed on primary front right leg 4. Primary stroller portion 2 preferably further comprises primary seat 22 for seating a child. Primary foot rest 17 is preferably disposed between primary front left leg 1 and primary front right leg 4 to allow a seated child to rest his or her feet and further prevent the feet from hitting the ground and possibly becoming entangled.

Continuing with FIG. 1, secondary stroller portion 52 preferably comprises secondary front left leg 51, secondary front right leg 57, secondary rear left leg 63, and secondary rear right leg 60 to provide support to the convertible dual stroller 3 and the secondary seat 71. Secondary stroller portion 52 preferably further comprises first secondary inter-connector 65 preferably positioned between and disposed on secondary front left leg 51 and secondary rear right leg 60. Second secondary inter-connector 64 is preferably positioned between and disposed on secondary front right leg 57 and secondary rear left leg 63. Inter-connectors 64, 65 are optionally pivotally secured via swivels 18, wherein swivels 18 are in pivotal communication with legs 51, 57, 60 and 63. First secondary inter-connector 65 and second secondary inter-connector 64 provide support to convertible dual stroller 3 while still allowing the secondary stroller portion 52 to be collapsed for compact storage or to allow convertible dual stroller 3 to seat only one child while secondary stroller portion 52 is collapsed and primary stroller portion 2 is expanded. Secondary front right leg 57 preferably has secondary front right leg wheel set 77 rotationally disposed thereon and secondary rear right leg 60 preferably has secondary rear right leg wheel set 80 rotationally disposed thereon. Further, secondary front right leg wheel set 77 and secondary rear right leg wheel set 80 each preferably have at least one wheel 19 disposed thereon. Secondary front right leg wheel set 77, secondary rear right leg wheel set 80 and wheel 19 allow easier maneuverability of the convertible dual stroller 3 over terrain. Secondary stroller portion 52 further preferably comprises secondary upper left frame member 81 disposed on secondary front left leg 51 and secondary upper right frame member 83 disposed on secondary front right leg 57. Secondary stroller portion 52 further preferably comprises secondary seat 71 for seating a second child. Secondary foot rest 66 is preferably disposed between secondary front left leg 51 and secondary front right leg 57 to allow a child to rest their feet.

Still referring to FIG. 1, primary stroller portion 2 optionally further comprises front support 54 disposed on primary front right leg 4 to support and/or stabilize secondary front left leg 51 of secondary stroller portion 52 when convertible dual stroller 3 is fully expanded so that both primary stroller portion 2 and secondary stroller portion 52 are fully open, thereby preferably exposing primary seat 22 and secondary seat 71 for seating of children. Secondary stroller portion 52 is preferably releasably secured to primary stroller portion 2 and secondary stroller portion 52 may be collapsed when convertible dual stroller 3 is partially expanded and partially collapsed to seat one child while primary stroller portion 2 supports and transports secondary stroller portion 52 while secondary stroller portion 52 is collapsed. Additionally, secondary stroller portion 52 is preferably fully removable from primary stroller portion 2 if use of only one stroller is desired, although secondary stroller portion 52 would not be operationally functional without primary stroller portion 2 due to the lack of wheels on left side of secondary stroller portion. Primary stroller portion 2 preferably also further comprise rear bracket 68 (best shown in FIG. 3B), preferably disposed on primary right rear leg 8 to preferably secure secondary rear left leg 63, thereby preventing separation of primary stroller portion 2 and secondary stroller portion 52. In an alternate embodiment, primary upper right member 29 and secondary upper left member 81 may be unitary (best shown in FIG. 4) or may be physically attached via riveting; however, one skilled in the art would recognize any means of joining primary rear right leg 8 and secondary rear left leg 63, could include, but not be limited to screws, bolts, rivets, glue clamps, welding, zip ties, tape and/or any combination thereof.

Figure 5:
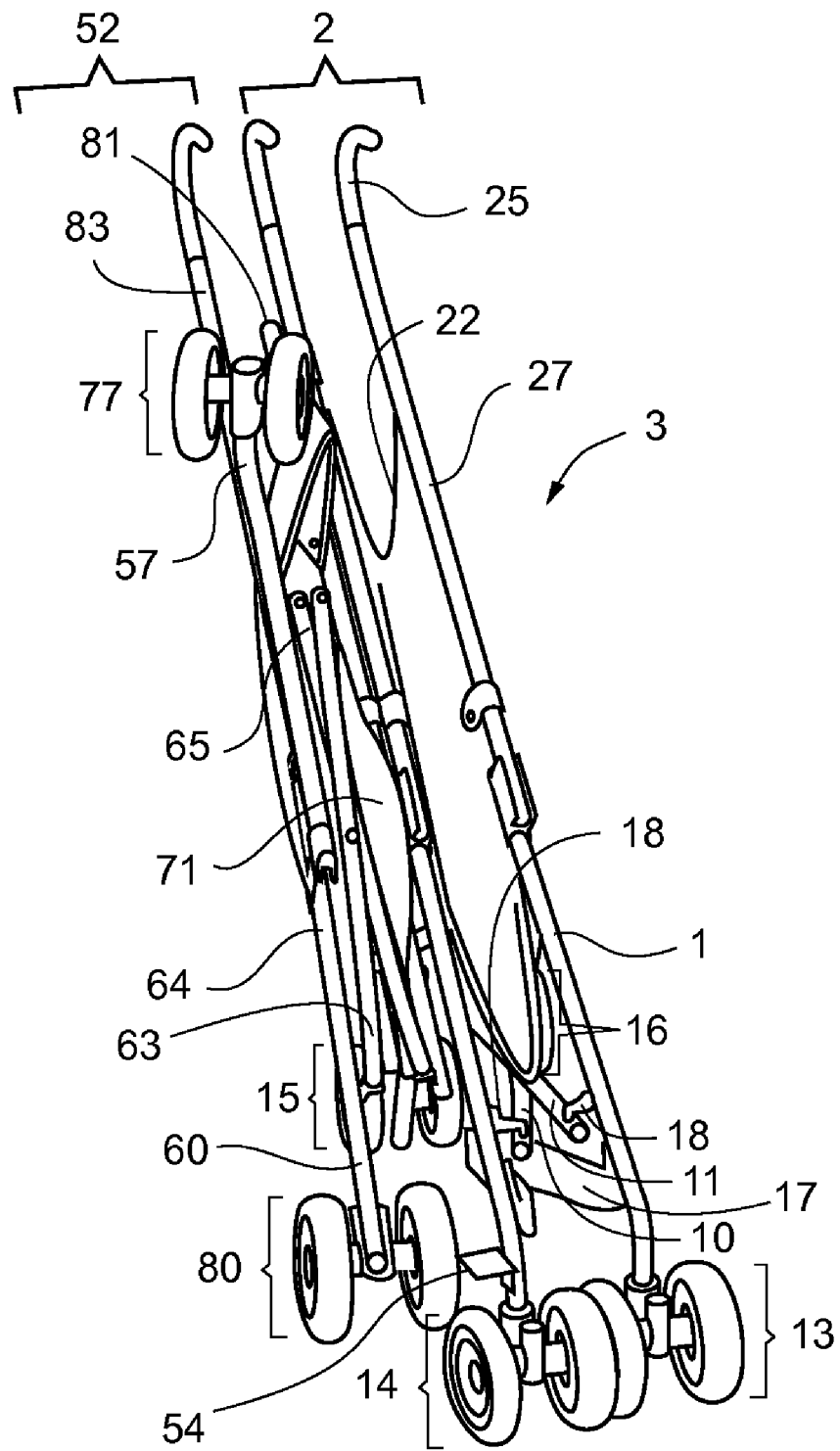
FIG. 5 depicts a convertible dual stroller with both portions collapsed.

Referring now more particularly to FIG. 2, convertible dual stroller 3 is shown with primary stroller portion 2 expanded and secondary stroller portion 52 collapsed. As shown in FIG. 5, both secondary stroller portion 52 and primary stroller portion 2 are preferably collapsible together for easier storage of convertible dual stroller 3 and preferably collapse similarly to umbrella strollers.

Referring to FIGS. 1 and 2, convertible dual stroller 3 may preferably further comprise braking system 74 on primary stroller portion 2, secondary stroller portion 52 or both. Convertible dual stroller 3 preferably also comprises at least one handle 25 to aid in pushing convertible dual stroller 3.

Referring now more particularly to FIG. 3A, an alternate embodiment of convertible dual stroller 3 comprises rear bracket 68 disposed on primary right rear leg 8 to secure secondary rear left leg 63 and prevent lateral movement of secondary rear left leg 63. Rear bracket 68 preferably comprises both lower portion 69 and flange 70, wherein flange 70 preferably restrains secondary rear left leg 63 from lateral movement, particularly when convertible dual stroller 3 is pulled backwards, thus inhibiting the tendencies of primary stroller portion 2 and secondary stroller portion 52 to separate when pulled in a backwards direction. One skilled in the art would recognize alternate forms of bracket 68 may be used as demonstrated by FIGS. 3A and 3B, including, without limitation, clamps, brackets, loops, other devices which restrain lateral movement while permitting vertical movement and/or any combination thereof.

Further, when secondary stroller portion 52 is opened to an operational position (best shown in FIG. 1), secondary rear left leg 63 is in supported communication with rear bracket 68.

Referring now more particularly to FIG. 3B, a preferred embodiment of convertible dual stroller 3 comprises rear bracket 68 disposed on primary right rear leg 8 to secure secondary rear left leg 63 and prevent lateral movement of secondary rear left leg 63. Rear bracket 68 preferably comprises primary rear right leg securing area 93 disposed on or around primary right rear leg 8 and flange 90, wherein flange 90 preferably restrains secondary rear left leg 63 from lateral movement, particularly when convertible dual stroller 3 is pulled backwards, thus inhibiting the tendencies of primary stroller portion 2 and secondary stroller portion 52 to separate when pulled in a backwards direction. One skilled in the art would recognize alternate forms of bracket 68 may be used as demonstrated by FIGS. 3A and 3B, including, without limitation, clamps, brackets, loops, other devices which restrain lateral movement while permitting vertical movement and/or any combination thereof.

In use, convertible dual stroller 3 is fully expandable to seat two children as shown in FIG. 1. One child preferably sits in primary seat 22 of primary stroller portion 2 while another child preferably sits in secondary seat 71 of secondary stroller portion 52. Convertible dual stroller 3 is also preferably convertible to seat one child in primary stroller portion 2 when secondary stroller portion 52 is collapsed and not utilized as shown in FIG. 2. Additionally, secondary stroller portion 52 is preferably removable from primary stroller portion 2 so primary stroller portion 2 may be utilized as a fully functional individual stroller without the extra weight and encumbrances of secondary stroller portion 52. Further, both primary stroller portion 2 and secondary stroller portion 52 are preferably both collapsible for storage purposes.

The foregoing description and drawings comprise illustrative embodiments of the present invention. Having thus described exemplary embodiments of the present invention, it should be noted by those skilled in the art that the embodiments within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

What is claimed is:

1. A convertible dual stroller comprising:
   a primary stroller portion, wherein said primary stroller portion comprises a plurality of primary front legs, a primary left rear leg, a primary right rear leg, a primary upper left frame member and a primary upper right frame member;
   a secondary stroller portion, wherein said secondary stroller portion comprises a secondary front left leg, a secondary front right leg, a secondary rear left leg, a secondary rear right leg, a secondary upper left frame member and a secondary upper right frame member, and wherein a substantial portion of the weight of said secondary stroller portion is borne by said primary stroller when said primary stroller portion and said secondary stroller portion are fully expanded, said convertible dual stroller further comprising a rear bracket, wherein when said secondary stroller portion is opened to an operational position, said secondary rear left leg is in supported communication via said rear bracket.

2. The apparatus of claim 1 further comprising a front support, wherein when said secondary stroller portion is opened to an operational position, said secondary front left leg is in supported communication via said front support.

3. A convertible dual stroller comprising:
   a primary stroller portion, wherein said primary stroller portion comprises a plurality of primary front legs, a primary left rear leg, a primary right rear leg, a primary upper left frame member and a primary upper right frame member;
   a secondary stroller portion, wherein said secondary stroller portion comprises a secondary front left leg, a secondary front right leg, a secondary rear left leg, a secondary rear right leg, a secondary upper left frame member and a secondary upper right frame member, and wherein a substantial portion of the weight of said secondary stroller portion is borne by said primary stroller when said primary stroller portion and said secondary stroller portion are fully expanded, and wherein said secondary rear left leg is laterally restrained by a rear bracket disposed on said primary rear right leg when said secondary stroller portion is opened to an operational disposition.

4. The apparatus of claim 1, wherein said primary upper right frame member and said secondary upper left frame member comprise a unitary piece.

5. The apparatus of claim 1, wherein said primary stroller portion further comprises a plurality of primary inter-connectors disposed between said front legs and said primary left rear leg and said primary right rear leg.

6. The apparatus of claim 1, wherein said secondary stroller portion further comprises a plurality of secondary inter-connectors positioned between said secondary front left leg, said secondary front right leg, said secondary rear left leg, and said secondary rear right leg.

7. The apparatus of claim 1, wherein said primary stroller portion further comprises a primary seat.

8. The apparatus of claim 1, wherein said secondary stroller portion further comprises a secondary seat.

9. The apparatus of claim 1, wherein said primary stroller portion further comprises a plurality of primary wheels disposed on said plurality of primary front legs, on said primary left rear leg and on said primary right rear leg.

10. The apparatus of claim 1, wherein said secondary stroller portion further comprises at least one secondary wheel disposed on said secondary front right leg and at least one secondary wheel disposed on said secondary rear right leg.

11. The apparatus of claim 1, wherein said primary stroller portion and said secondary stroller portion are disposed side-by-side.

12. The apparatus of claim 1, wherein said primary stroller portion and said secondary stroller portion each further comprise a foot rest.

13. A convertible dual stroller comprising:
a primary stroller portion, wherein said primary stroller portion comprises a plurality of primary front legs, a primary left rear leg, a primary right rear leg, a primary upper left frame member and a primary upper right frame member;
a secondary stroller portion, wherein said secondary stroller portion comprises a secondary front left leg, a secondary front right leg, a secondary rear left leg, a secondary rear right leg, a secondary upper left frame member and a secondary upper right frame member, and wherein a substantial portion of the weight of said secondary stroller portion is borne by said primary stroller when said primary stroller portion and said secondary stroller portion are fully expanded, and wherein said secondary stroller portion is secured to said primary stroller portion, and wherein said secondary stroller portion is functionally inoperable when separated from said primary stroller portion.

14. The apparatus of claim 1, wherein said convertible dual stroller comprises at least one handle.

15. The apparatus of claim 1, wherein said secondary stroller portion is collapsed, and wherein said primary stroller portion is expanded.

16. The apparatus of claim 1, wherein said primary stroller portion and said secondary stroller portion are collapsed.

17. The apparatus of claim 1, wherein said convertible dual stroller comprises six wheel sets.

18. The apparatus of claim 17, wherein each of said six wheel sets further comprises at least one wheel.

19. The apparatus of claim 18, wherein each of said six wheel sets is rotationally secured to said convertible dual stroller such that said at least one wheel moves.

20. A method of converting stroller from dual occupancy to single occupancy, said method comprising the steps of:
obtaining a stroller comprising a primary stroller portion and a secondary stroller portion; and
collapsing said secondary stroller portion, wherein said secondary stroller portion is secured to said primary stroller portion, and wherein said primary stroller portion and secondary stroller portion are arranged in a side-by-side relation, and wherein a secondary rear left leg of said secondary stroller portion is laterally restrained by a rear bracket disposed on a primary rear right leg of said primary stroller portion when said secondary stroller portion is opened to an operational disposition.

21. A convertible dual/single stroller system comprising:
a primary stroller, wherein said primary stroller comprises a plurality of primary front legs, a plurality of primary rear legs, a plurality of primary inter-connectors positioned between said plurality of primary front legs and said plurality of primary rear legs, a plurality of wheels disposed on said plurality of primary front legs and on said plurality of primary rear legs, a primary upper left frame member, a primary upper right frame member and a primary seat disposed on said primary stroller, and wherein said primary stroller is collapsible;
a secondary stroller, wherein said secondary stroller comprises a secondary front left leg, a secondary front right leg, a secondary rear left leg, a secondary rear right leg, a first secondary inter-connector positioned between said secondary front left leg and said secondary rear right leg, a second secondary inter-connector positioned between said secondary front right leg and said secondary rear left leg, at least one wheel disposed on said secondary front right leg and said secondary rear right leg, a secondary upper left frame member, a secondary upper right frame member and a secondary seat disposed on said secondary stroller, and wherein said secondary stroller is collapsible independent of said primary stroller and wherein said secondary stroller is removably secured to said primary stroller, and wherein said primary stroller substantially supports the weight of said secondary stroller; and
a rear bracket, wherein said secondary rear left leg is restrained by a rear bracket when said secondary stroller portion is opened to an operational disposition.

* * * * *